(12) United States Patent
Ha et al.

(10) Patent No.: US 11,975,981 B2
(45) Date of Patent: May 7, 2024

(54) MWW-TYPE ZEOLITE WITH MACROSCALE HOLLOW STRUCTURE

(71) Applicant: SOGANG UNIVERSITY RESEARCH & BUSINESS DEVELOPMENT FOUNDATION, Seoul (KR)

(72) Inventors: Kyoung-Su Ha, Hanam-si (KR); Chanwoo Kim, Seoul (KR); Hyunjin Shim, Seongnam-si (KR); Dongmin Lee, Seoul (KR)

(73) Assignee: SOGANG UNIVERSITY RESEARCH & BUSINESS DEVELOPMENT FOUNDATION, Seoul (KR)

( * ) Notice: Subject to any disclaimer, the term of this patent is extended or adjusted under 35 U.S.C. 154(b) by 0 days.

(21) Appl. No.: 17/685,052

(22) Filed: Mar. 2, 2022

(65) Prior Publication Data
US 2023/0278879 A1    Sep. 7, 2023

(51) Int. Cl.
*C01B 39/48* (2006.01)
*B01J 29/70* (2006.01)
(Continued)

(52) U.S. Cl.
CPC .......... *C01B 39/48* (2013.01); *B01J 29/7038* (2013.01); *B01J 37/06* (2013.01); *B01J 37/08* (2013.01);
(Continued)

(58) Field of Classification Search
CPC ...... C01B 39/48; C01B 32/05; B01J 29/7038; B01J 37/06; B01J 37/08; C01P 2002/02; C01P 2004/34
See application file for complete search history.

(56) References Cited

U.S. PATENT DOCUMENTS

| 4,439,409 A | 3/1984 | Puppe et al. |
| 4,826,667 A | 5/1989 | Zones et al. |
(Continued)

FOREIGN PATENT DOCUMENTS

| CN | 101618336 A | 1/2010 |
| EP | 0 293 032 B1 | 7/1993 |
(Continued)

OTHER PUBLICATIONS

Zhu et al (Mesoporous Carbon Prepared from Carbohydrate as Hard Template for Hierarchical Zeolites, European Journal of Inorganic Chemistry, 2007) (Year: 2007).*
(Continued)

*Primary Examiner* — Colin W. Slifka
*Assistant Examiner* — Logan Edward Laclair
(74) *Attorney, Agent, or Firm* — Hoffmann & Baron, LLP

(57) ABSTRACT

The present invention provides zeolite hollow spheres in which zeolite crystals grow to form a framework of macropore through a hydrothermal crystallization process using the hydrophilic surface of a carbon sphere as a hard template, wherein the zeolite framework is an ordered, porous crystalline zeolite material with a number of channels or pores interconnected, which has pore structures including mesopores and micropores.

The zeolite hollow spheres of the present invention can be used for various purposes such as catalysts and adsorbents.

8 Claims, 8 Drawing Sheets
(6 of 8 Drawing Sheet(s) Filed in Color)

(51) Int. Cl.
  *B01J 37/06* (2006.01)
  *B01J 37/08* (2006.01)
  *C01B 32/05* (2017.01)
(52) U.S. Cl.
  CPC .......... *C01B 32/05* (2017.08); *C01P 2002/02* (2013.01); *C01P 2004/34* (2013.01)

(56) References Cited

U.S. PATENT DOCUMENTS

| | | | |
|---|---|---|---|
| 4,954,325 | A | 9/1990 | Rubin et al. |
| 5,236,575 | A | 8/1993 | Bennett et al. |
| 5,250,277 | A | 10/1993 | Kresge et al. |
| 5,362,697 | A | 11/1994 | Fung et al. |
| 6,077,498 | A | 6/2000 | Diaz Cabañas et al. |
| 6,565,826 | B2 | 5/2003 | Jacobsen et al. |
| 6,936,744 | B1 | 8/2005 | Cheng et al. |
| 8,115,001 | B2 | 2/2012 | Corma Canos et al. |
| 2008/0027247 | A1 | 1/2008 | Corma Canos et al. |

FOREIGN PATENT DOCUMENTS

| | | |
|---|---|---|
| WO | 97/17290 A1 | 5/1997 |
| WO | 2005/118476 A1 | 12/2005 |

OTHER PUBLICATIONS

Houssin et al (Combined in situ29Si NMR and small-angle X-ray scattering study of precursors in MFI zeolite formation from silicic acid in TPAOH solutions, Physical Chemistry Chemical Physics, 2003) (Year: 2003).*
Chu et al (Nestlike Hollow Hierarchical MCM-22 Microspheres: Synthesis and Exceptional Catalytic Properties, Chemistry of Materials, 2010) (Year: 2010).*
Ryu et al (Hydrothermal preparation of carbon microspheres from mono-saccharides and phenolic compounds, Carbon, 2010) (Year: 2010).*
Chemical data sheet for metasilicic acid (Year: 2003).*
Chen, et al., "A Method for the Fabrication of Monodisperse Hollow Silica Spheres**," Adv. Mater. 2006, 18, 801-806. DOI: 10.1002/adma.200501528.
Chu, et al., "Nestlike Hollow Hierarchical MCM-22 Microspheres: Synthesis and Exceptional Catalytic Properties," Chem. Mater. 2010, 22, 2757-2763. DOI:10.1021/cm903645p.
Li and Shahbazi, "A Review of Hydrothermal Carbonization of Carbohydrates for Carbon Spheres Preparation," Tr Ren Energy, 2015, vol. 1, No. 1, 43-56. doi: 10.17737/tre.2015.1.1.009.
Ryu, et al., "Hydrothermal preparation of carbon microspheres from mono-saccharides and phenolic compounds," Carbon 48 (2010) 1990-1998. doi:10.1016/j.carbon.2010.02.006.
Wang, et al., Fabrication of hollow zeolite spheres, Chem. Commun., 2000, 2161-2162. DOI: 10.1039/b006539k.
Wang, et al., "Facile Fabrication of ZSM-5 Zeolite Hollow Spheres for Catalytic Conversion of Methanol to Aromatics," Catal. Sci. Technol., 2016, 00, 1-4. DOI: 10.1039/C6CY02476A.

* cited by examiner

Carbon black의 SEM image   Na-HS-MCM-22의 SEM image

Carbon sphere의 SEM image   Na-HS-MCM-22의 SEM image
(silica source = LUDOX AS-40 colloidal silica)

HS-MCM-22 (silica source = silicic acid)

Conventional MCM-22

HS-MCM-22

MCM-22
0.4 g / 1.1 cm³ = 0.36 g/cm³

HS-MCM-22
0.15 g / 1.1 cm³ = 0.13 g/cm³

MWW-TYPE ZEOLITE WITH MACROSCALE HOLLOW STRUCTURE

FIELD OF THE INVENTION

The present invention relates to zeolite hollow spheres in which zeolite crystals grow to form a macropore framework, such as an MWW-type zeolite having a macroscale hollow structure, and a method and use thereof (for example, a catalyst for hydrocarbon conversion).

BACKGROUND OF THE INVENTION

Nanoporous materials are a kind of nanostructured catalyst and have been used in various fields such as oil refining and petrochemicals, energy conversion and photocatalysts, green chemistry and environmental fields, asymmetric synthesis, biomimicry technology, molecular printing technology, etc.

According to the IUPAC (International Union of Pure and Applied Chemistry) definition, nano-porous material refers to a porous material with a pore size between 1 and 100 nm, and depending on the pore size, it is divided into microporous material including zeolite (2 nm or less), mesoporous material (2-50 nm) including mesoporous carbon, and macroporous material (50 nm or more) such as silica gel.

Natural and synthetic molecular sieve materials have catalytic properties for the conversion of various types of hydrocarbons. Mesoporous materials such as zeolite and AlPO, which correspond to molecular sieves, are ordered, porous crystalline materials having a crystalline structure defined by X-ray diffraction (XRD). In a crystalline molecular sieve material, a plurality of cavities exist that are interconnected by a plurality of channels or pores. These cavities and pores are uniform in size within a particular molecular sieve material. Since the dimensions of the pores are to allow for adsorbed molecules of certain dimensions while rejecting those of larger dimensions, these materials are known as "molecular sieves" and are used in a variety of industrial processes.

These natural and synthetic molecular sieves include a variety of cation-containing crystalline silicates. These silicates can be described as a rigid three-dimensional framework of $SiO_4$ and an oxide of a group 13 element of the periodic table (e.g., $AlO_4$), in which the tetrahedron is crosslinked by assigning oxygen atoms, and the ratio of oxygen atoms to the sum of group 13 elements (e.g., aluminum) and silicon atoms is 1:2. The electron valence of a tetrahedron containing a Group 13 element such as aluminum is balanced by the cations in the crystal (e.g. protons, alkali metal or alkaline earth metal cations). It can be expressed as a ratio of 1 to the number of Group 13 elements (e.g., aluminum) to various cations (e.g., $H^+$, $Ca^{2+}/2$, $Sr^{2+}/2$, $Na^+$, $K^+$ or $Li^+$).

Zeolites can be classified into large pore zeolites, medium pore zeolites and small pore zeolites. Large pore zeolites generally have a pore size of about 7 Å or greater, including, but not limited to, mazzite, offretite, zeolite L, VPI-5, zeolite Y, zeolite X, zeolite omega and zeolite beta. Medium pore zeolites generally have pore sizes of from about 5 to less than about 7 Å, including, but not limited to, ZSM-5, ZSM-11, ZSM-22, MCM-22, silicalite 1 and silicalite 2. Small pore zeolites have a pore size of from about 3 to less than about 5.0 Å, including, but not limited to, ZK-4, ZSM-2, SAPO-34. SAPO-35, ZK-14, SAPO-42, ZK-21, ZK-22, ZK-5, ZK-20, zeolite A, chabazite, zeolite T, gmelinite, ALPO-17 and clinoptilolite.

Hydrothermal synthesis, used for zeolite synthesis, is one of liquid phase synthesis methods, and refers to a process for synthesizing a material using water or a thermal solution or fluid under high temperature and high pressure. It is a method of synthesizing metal salts, oxides, hydrates, or metal powders or growing crystals in solution or suspension by using properties dependent on the solubility of substances, temperature, pressure, and concentration of solvents. Hydrothermal synthesis is a method of synthesizing a single crystal that depends on the solubility of minerals under hot water and high pressure. It is a commonly used synthesis method when direct melting is difficult. The role of hydrothermal solution (or fluid) in hydrothermal synthesis is as a medium for transferring heat and pressure during hydrothermal synthesis, and acts as a reactant, solvent, surface adsorbent, catalyst, etc. In hydrothermal synthesis, a hydrothermal solution (or fluid) promotes chemical reactions and crystallization, acts as a reaction solvent during ion exchange or extraction, and acts as an erosion and solidification agent. The hydrothermal synthesis method has a fast reaction rate and good dispersibility, making it easy to prepare a solid solution or compound having a uniform crystalline phase. In addition, by controlling the pressure, temperature, solution, and additives, it is possible to control the particle size, shape, particle size distribution, composition, and purity. Further, it is possible to prepare fine particles in a uniform crystalline phase.

Hexamethyleneimine is an organic additive that acts as a directing agent for the hydrothermal synthesis of MCM-56 (U.S. Pat. No. 5,362,697). Hexamethyleneimine can also be used as a directing agent in the synthesis of crystalline molecular sieves MCM-22 (U.S. Pat. No. 4,954,325) and MCM-49 (U.S. Pat. No. 5,236,575). The molecular sieve of zeolite SSZ-25 (U.S. Pat. No. 4,826,667) is synthesized from a hydrothermal reaction mixture containing adamantane quaternary ammonium ions.

MCM-22 molecular sieve is a material that forms a MWW structure, and its synthesis method is exemplified in U.S. Pat. No. 4,954,325. As a catalyst and/or a catalyst carrier, it shows good catalyst performance during reactions such as alkylation, toluene disproportionation, and xylene isomerization.

As used herein, "MCM-22 family material" or "MCM-22 family molecular sieve" refers to (i) a molecular sieve prepared from a "unit cell having a MWW framework morphology", wherein in order to describe a crystal, a unit cell is a spatial arrangement of atoms which is tiled in three-dimensional space; (ii) molecular sieves prepared from two-dimensional tiling of MWW framework type unit cells, forming "monolayers of one unit cell thickness", preferably of one c-unit cell thickness; (iii) molecular sieves prepared from "layers of one or more unit cells" prepared by stacking, packing, or bonding two or more monolayers of one unit cell thickness of a unit cell having a MWW framework morphology, wherein the stacking of building blocks may exist in a regular manner, an irregular manner, a random manner, or any combination thereof); and (iv) molecular sieves prepared by any regular or random two-dimensional or three-dimensional combination of unit cells having a MWW framework morphology.

The MCM-22 family material has an X-ray diffraction pattern that includes d-spacing maxima at 12.4±0.25, 3.57±0.07 and 3.42±0.07 Å. In addition, the MCM-22 family material has an X-ray diffraction pattern including d-spacing maxima at 12.4±0.25, 6.9±0.15, 3.57±0.07 and 3.42±0.07 Å.

Materials belonging to the MCM-22 family include MCM-22 (U.S. Pat. No. 4,954,325), PSH-3 (U.S. Pat. No. 4,439,409), SSZ-25 (U.S. Pat. No. 4,826,667), ERB-1 (European Patent No. 0293032), ITQ-1 (U.S. Pat. No. 6,077, 498), ITQ-2 (International Patent Publication No. WO97/17290), ITQ-30 (International Patent Publication No. WO2005/118476), MCM-36 (U.S. Pat. No. 5,250,277), MCM-49 (U.S. Pat. No. 5,236,575) and MCM-56 (U.S. Pat. No. 5,362,697).

MCM-22 family molecular sieve has been found to be useful in a variety of hydrocarbon conversion processes. The MCM-22 family molecular sieve is useful for the alkylation of aromatic compounds (U.S. Pat. No. 6,936,744).

Generally, zeolite is a crystalline aluminum silicate material with micropores of molecular size (0.2-2 nm). It is widely used for various purposes (catalyst, adsorbent, ion exchanger, absorber, etc.) due to its pore characteristics and ion exchange function. In particular, when these zeolites are used as catalysts or catalyst supports, the pore properties greatly influence the catalyst performance. In a zeolite having micropores, when molecules diffuse-migrate and react within the pores, diffusion is very slow, causing problems such as slow reaction, increase of side reactions or shortening of catalyst life. Attempts have been made to overcome the shortcomings of microporous zeolites, by making the zeolite crystal size small to increase the external surface area and shorten the movement distance in the zeolite crystal, or by making a hollow in the zeolite crystal, so that molecular movement occurs through the hollow and the reaction occurs in the micropore.

When having micropores and hollows at the same time compared to the case of only micropores, catalyst performance is greatly improved, and in particular, life span or selectivity of catalyst is improved. In the case of only micropores, the length of the reactant or product passing through the zeolite pores is long, which causes side reactions or coke to shorten the life span of catalyst and slows the diffusion rate of molecules. On the other hand, in the case of a zeolite having a hollow, the reaction mainly occurs within the micropore, but the movement of the molecules (reactant or product) occurs quickly through the hollow adjacent to the micropore, and the retention time in the micropore is short, so it has the advantages of excellent catalyst selectivity and long catalyst life due to low coke generation. A zeolite composed only of micropores has a characteristic of mainly participating in the reaction only on the surface of the zeolite crystal, but a zeolite having a hollow has an advantage of high utilization by participating in a catalytic reaction throughout the crystal.

Preparation of hollow zeolites has been attempted in various ways.

For example, in the literature (*Catal. Sci. Technol.* 2017, 7, 560, Facile fabrication of ZSM-5 zeolite hollow spheres for catalytic conversion of methanol to aromatics), ZSM-5 hollow spheres were synthesized by a soft template method. That is, Na$^+$EDTA and n-butylamine were used as soft templates. As a result, the size was about 30-50 μm, and it appeared to have a sphere shape with a non-uniform shape as a whole. Therefore, when synthesizing with a hard template method rather than a soft template, it will be easy to control the size and shape because it grows to fit the size of the hard template.

Hollow spheres of molecular sieves are mainly prepared using polystyrene microspheres as templates and combined with layer-by-layer self-assembly and hydrothermal or gas-phase transition crystallization processes (Chem. Commun., 2000, 2161-2162 and Adv. Mater. 2006, 18, 801-806). The literature (Chem. Commun., 2000, 2161-2162, Fabrication of hollow zeolite spheres, Wang, X. D, Yang, W. L, Tang, Y., Wang, Y. J., Fu, S. K., & Gao, Z. (2000) describes the synthesis method using petroleum-based synthetic polymer beads as a hard template, in which polystyrene latex beads are pre-treated to have a positive charge, and then used as a hard template and zeolite crystal growth is induced, thereby to form hollow sphere silicalite-1, β. Since the hard template size was uniform, it was also shown that the hollow sphere zeolite produced had a uniform size. However, the method for producing hollow molecular sieves using polymeric microspheres as a hard template involves complex operation steps, is poorly controlled and is relatively expensive.

Meanwhile, in U.S. Pat. No. 6,565,826, a template such as activated carbon was mixed with a zeolite synthetic gel to form a hollow, and then a hollow zeolite was synthesized by hydrothermal synthesis.

CN101618336A prepares MCM-22 molecular sieve hollow spheres by hydrothermal crystallization using carbon black particles as a template. The carbon black template has a wider raw material range and lower cost, compared to polystyrene microsphere template. However, because of the non-uniformity of the carbon black particles and the particle size generally greater than 20 microns, the hollow spheres obtained have a relatively large particle size and correspondingly thin pore walls, making these hollow spheres fragile.

It can be seen that the molecular sieve hollow spheres to date are not sufficiently controllable because hard templates such as polymer microspheres and carbon black are used. Further, since the amount of hard template used is relatively large, it is difficult to be burnt out and the combustion of such template can cause a large amount of environmental pollutants.

BRIEF SUMMARY OF THE INVENTION

It is an object of the present invention to provides a synthesis method of zeolite hollow spheres with pore structures including mesopores and micropores, characterized in that after synthesizing carbon spheres that are close to an ideal spherical shape, controllable in size, and exhibiting surface-hydrophilic properties by controlling the synthesis conditions, the hydrophilic surface of the carbon spheres is used as a hard template for easy crystal growth of silica, and zeolite hollow spheres having pore structures including mesopores and micropores are synthesized through a hydrothermal crystallization process.

A first aspect of the present invention provides a method of producing zeolite hollow spheres in which zeolite crystals, having pore structures including mesopores and micropores, grow to form a macropore framework, comprising:

a $1^{st}$ step of preparing a carbon sphere having a hydrophilic surface, which are synthesized by hydrothermal carbonization of a carbohydrate, at least a part of which is represented by the general formula $(CH_2O)_n$;

a $2^{nd}$ step of preparing a zeolite synthetic gel containing the carbon spheres having the hydrophilic surface of the $1^{st}$ step as a hard template, a silica source, and an organic template compound;

a $3^{rd}$ step of synthesizing the zeolite hollow sphere in which a zeolite crystal, having pore structures including mesopores and micropores, grows to form the macropore framework, which is the outer wall of the hollow sphere, through a hydrothermal crystallization process using the hydrophilic surface of the carbon sphere as a hard template; and a 4th step of optionally, removing the carbon sphere used as the hard template.

A second aspect of the present invention provides zeolite hollow spheres in which zeolite crystals grow to form a framework of macropore through a hydrothermal crystallization process using the hydrophilic surface of a carbon sphere as a hard template, wherein the zeolite framework is an ordered, porous crystalline zeolite material with a number of channels or pores interconnected, which has pore structures including mesopores and micropores.

For example, the outer average diameter of the zeolite hollow spheres may be 2 to 15 μm.

A third aspect of the present invention provides a catalyst, catalyst support, adsorbent, ion exchanger or absorber comprising the zeolite hollow spheres of the second aspect of the present invention.

Herein, zeolite hollow spheres from which carbon spheres are removed or not removed may be used.

BRIEF DESCRIPTION OF THE DRAWINGS/FIGURES

The patent or application file contains at least one drawing executed in color. Copies of this patent or patent application publication with color drawing(s) will be provided by the Office upon request and payment of the necessary fee.

FIG. 1A is an FT-IR spectrum of carbon black nano powder purchased from PlasmaChem GmbH; FIG. 1B is an FT-IR spectrum of a carbon sphere; FIG. 1C is an SEM photograph of carbon black nano powder purchased from PlasmaChem GmbH (left) and HS-MCM-22 (right) synthesized by using it as a template and combining colloidal silica; FIG. 1D is an SEM photograph of the carbon sphere synthesized in Example 1 (left) and HS-MCM-22 (right) synthesized by using it as a template and combining colloidal silica.

DETAILED DESCRIPTION OF THE INVENTION

Figure 1A:
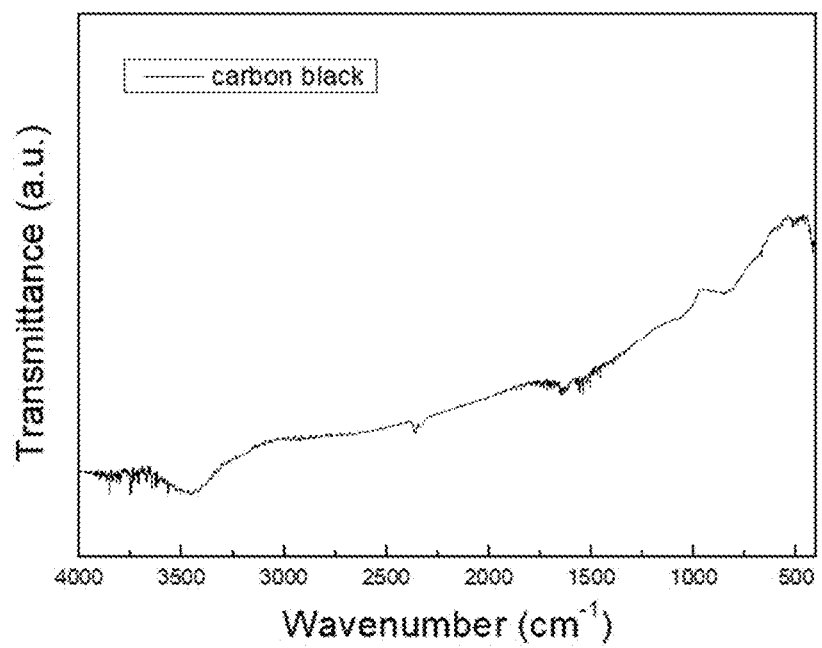

In general, nano-porous materials are classified into microporous materials (2 nm or less), mesoporous materials (2-50 nm), and macroporous materials (50 nm or more) according to the size of the pores.

Generally, the mesoporous material is synthesized by using an organic molecule such as a surfactant or an amphiphilic block copolymer as a structure directing agent to form a porous structure. A common feature of organic molecules used as structure directing agent is that they contain both a hydrophilic part and a hydrophobic part, so that self-assembly into various nanostructures is possible depending on the volume fraction (concentration) of each part, and from this, various mesoporous structures such as lamellar, hexagonal, cube, and spherical can be easily synthesized.

Crystal morphology, size and aggregation/agglomeration of zeolite can affect catalytic behavior, particularly catalytic activity, and stability. When the reactants first pass into a hollow sphere of zeolite, a solid acid, the reaction intermediate is trapped within the zeolite hollow sphere. For the reaction intermediate to diffuse out again, it must come out of the zeolite hollow sphere, in which case the opportunity or time to contact the active site of the zeolite increases.

To synthesize the zeolite hollow spheres, a feature of the present invention is to use the hydrophilic surface of the carbon sphere as a hard template so that the zeolite crystals are grown on the hard template through a hydrothermal crystallization process.

When a carbon sphere close to an ideal sphere has a hydrophilic functional group to be well dispersed in an aqueous solution and is used as a hard template to facilitate crystal growth of silica around the hard template, a zeolite (ex, HS-MCM-22) crystal having pore structures including mesopores and micropores grows to synthesize hollow spheres that form a framework of macropore.

Also, in order to synthesize a carbon sphere having a hydrophilic surface, another feature of the present invention is to use hydrothermal carbonization of a carbohydrate represented by the general formula $(CH_2O)_n$, which can form a carbon sphere while imparting a hydrophilic functional group to the carbon surface during hydrothermal carbonization.

In the present invention, carbohydrates represented by the general formula $(CH_2O)_n$, for example, saccharides including glucose, sucrose, sugars, starch, cellulose, etc., can be used as a source of a carbon sphere having a hydrophilic surface.

A saccharide is a unit structure of a carbohydrate, which is a biomolecule composed of carbon, hydrogen, and oxygen atoms and can be represented by the general formula $(CH_2O)_n$. Therefore, saccharides that can be obtained from nature are eco-friendlier and more economical than petroleum-based polymers. Further, when using carbon spheres synthesized by hydrothermal carbonization of saccharides rather than using petroleum-based polymer beads as a hard template for zeolite crystal growth, there is no need for a pre-treatment process to give a positive charge, and the synthesis process of a hard template is simple.

As shown in the literature (Chem. Mater. 2010, 22, 2757-2763, Nestlike Hollow Hierarchical MCM-22 Microspheres: Synthesis and Exceptional Catalytic Properties), the carbon black used here is not uniform in size and shape, so that it is difficult to use it as a hard template when synthesizing zeolite hollow spheres.

Carbon black (left side of FIG. 1C) having similar properties to carbon black, which was mentioned in the above literature to have a hydrophilic functional group so that colloidal silica ($SiO_2$) can adhere, was purchased from PlasmaChem GmbH. Then, the synthesis process was carried out similarly to the above literature, and as reported in the literature, similar zeolite hollow spheres could be synthesized (right side of FIG. 1C). However, the purchased carbon black nano powder had a porosity of 570±20 $m^2/g$ but had insignificant hydrophilic functional groups. FIG. 1A is an FT-IR spectrum of carbon black nano powder purchased from PlasmaChem GmbH, in which almost no hydrophilic functional groups were detected.

Figure 1B:
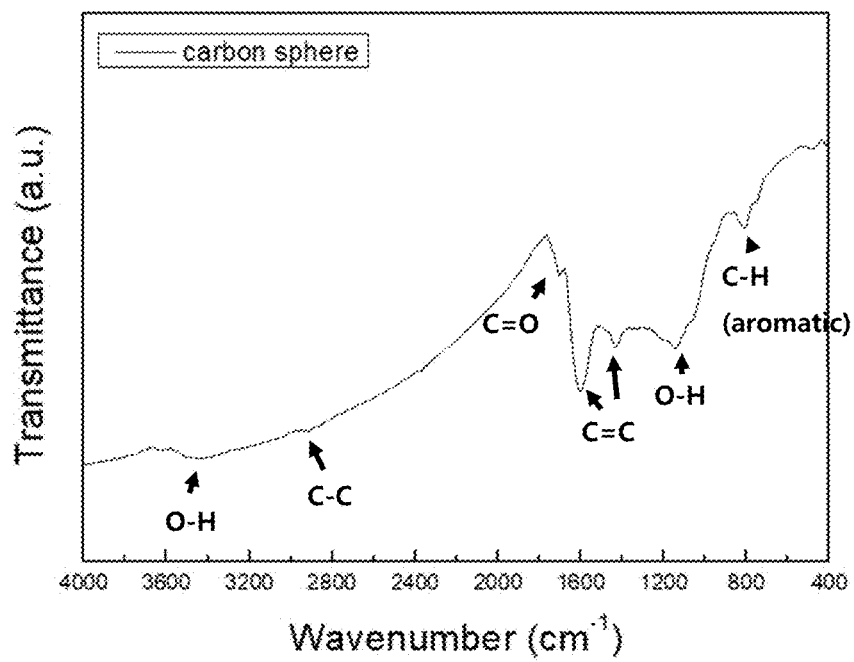
Figure 1C:
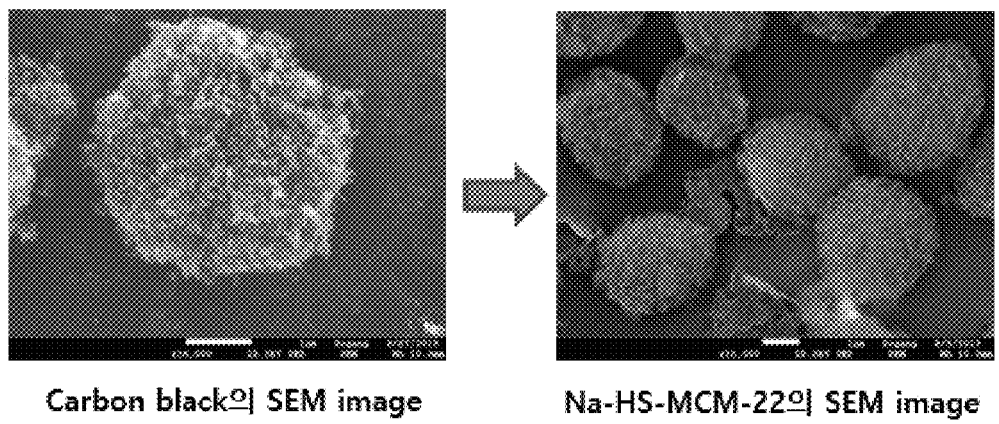
Figure 1D:
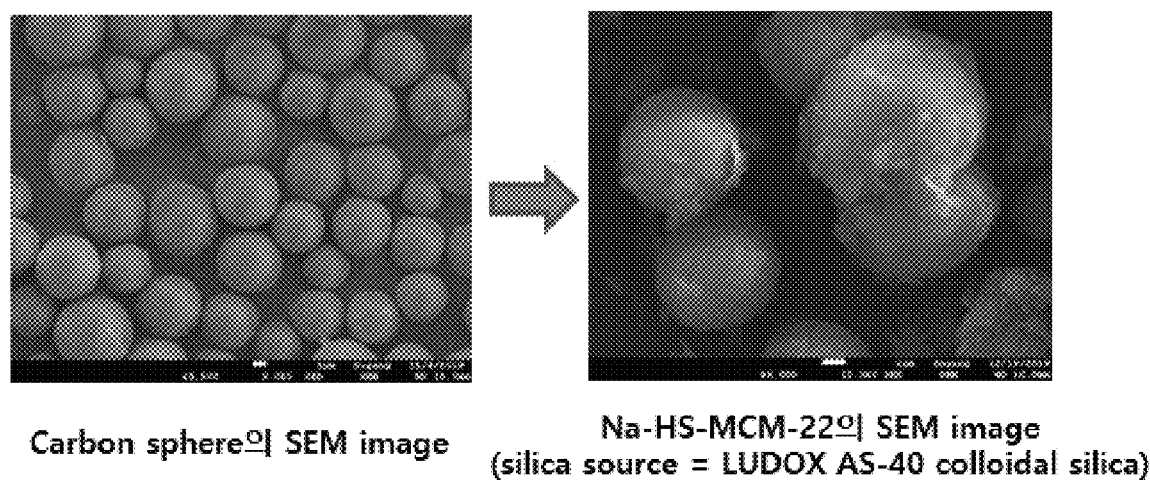

Meanwhile, FIG. 1B is an FT-IR spectrum of a carbon sphere that has been synthesized and finally calcined according to the present invention, in which many hydrophilic functional groups are detected. That is, the carbon sphere with little porosity synthesized in the present invention (FIG. 1B) is much richer in hydrophilic groups than the carbon black (left side of FIG. 1C). Nevertheless, as a result of synthesizing zeolite under the same conditions as in the literature using the carbon spheres of the present invention as a hard template and colloidal silica, it was confirmed that zeolite crystals did not grow well on a hard template (right side of FIG. 1D).

Based on these experimental results, it is thought that crystals were able to grow well around the template because the porous carbon black was impregnated with liquid colloidal silica. To grow crystals around a hard template, the porosity of the template is one of the important factors, so it is considered that due to the hydrophilic functional groups of carbon black, colloidal silica does not adhere well to the template, unlike mentioned in the above literature. That is, although carbon black has few hydrophilic functional groups (FIG. 1A) but has a specific surface area of 257 $m^2/g$ and significant porosity, it is inferred that the zeolite hollow spheres could be formed because colloidal silica was impregnated into the pores of carbon black due to its high porosity. On the other hand, the carbon sphere of the present invention is much richer in hydrophilic functional groups (FIG. 1B), but has almost no porosity, so it is inferred that colloidal silica is not crystallized around the hard template.

In addition, it was found that important points when synthesizing zeolite using a hard template technique are the porosity of the template and/or the chemical interaction between the template and the silica source. Compared to silica, silicic acid has —OH functional groups in its molecule, so it has more hydrophilic functional groups than silica. To enhance the chemical interaction with the template when synthesizing the zeolite, the carbon spheres synthesized in the present invention (FIG. 1) and silicic acid as a silica source having a hydrophilic functional group were used. As a result, the material of the present invention shown in FIG. 2 was obtained.

Based on this, a feature of the present invention is to use silicic acid instead of colloidal silica as a silica source to effectively utilize the hydrophilicity of carbon spheres although there is no porosity. That is, it is a feature of the present invention to strengthen the chemical interaction (i.e., hydrogen bond) based on the hydrophilic properties by using the hydrophilic property of the carbon sphere as a hard template and a material having a hydrophilic functional group (silicic acid) as a silica source.

For example, another feature of the present invention is to use silicic acid of Formula 1 as a silica source, to enhance the chemical interaction between silica and carbon spheres.

[Formula 1]

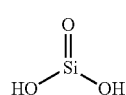

Figure 3:
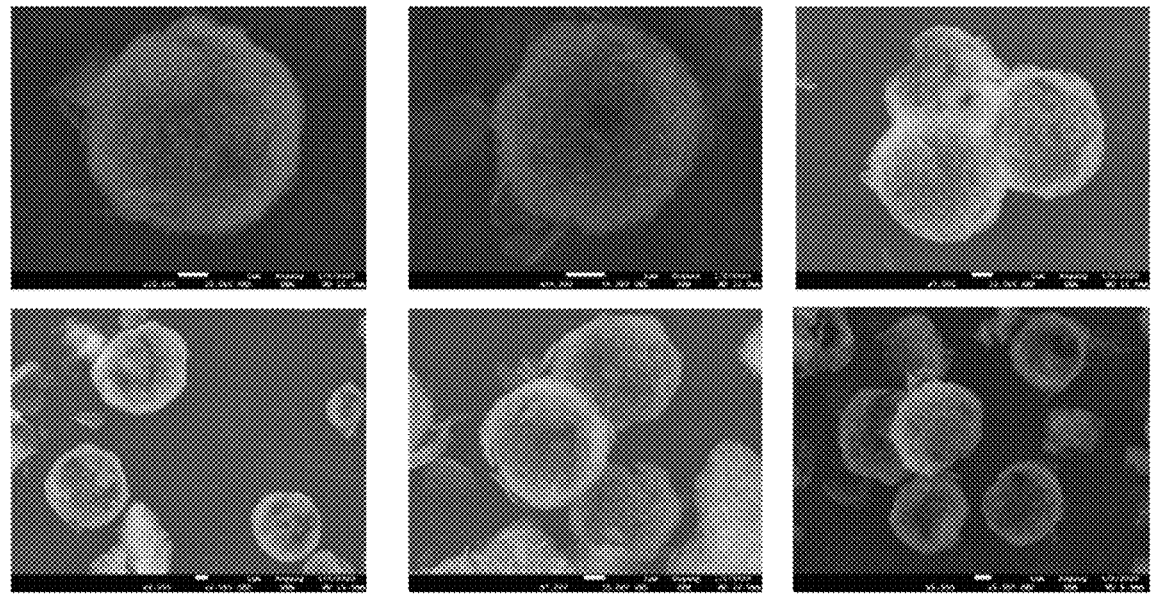
FIG. 3 is a SEM image of the HS-MCM-22 prepared in Example 2.

Therefore, in one embodiment of the present invention, as a result of synthesizing MCM-22 zeolite using silicic acid of Formula 1 and hydrophilic carbon spheres, the hollow sphere MCM-22 (HS-MCM-22) could be synthesized. In addition, as in Example 2, when a zeolite crystal is grown using a carbon sphere having a hydrophilic surface as a hard template and silicic acid (Formula 1) as a silica source, a cleaner morphology could be obtained (FIG. 3).

Accordingly, the method of producing zeolite hollow spheres in which zeolite crystals grow to form a macropore framework, according to the present invention comprises:
$1^{st}$ step of preparing a carbon sphere having a hydrophilic surface, which is synthesized by hydrothermal carbonization of a carbohydrate, at least a part of which is represented by the general formula $(CH_2O)_n$;
$2^{nd}$ step of preparing a zeolite synthetic gel containing the carbon spheres having the hydrophilic and mesoporous surface of the $1^{st}$ step as a hard template, a silica source, and an organic template compound;
$3^{rd}$ step of synthesizing the zeolite hollow sphere in which a zeolite crystal grows to form the macropore framework through a hydrothermal crystallization process using the hydrophilic surface of the carbon sphere as a hard template; and
$4^{th}$ step of optionally, removing the carbon sphere used as the hard template.

[$1^{st}$ Step of Preparing a Carbon Sphere Having a Hydrophilic Surface]

The contents of the literature [*Tr Ren Energy*, 2015, Vol. 1, No. 1, 43-56. doi: A Review of Hydrothermal Carbonization of Carbohydrates for Carbon Spheres Preparation] are incorporated herein.

Hydrothermal carbonization (HTC) is a thermochemical transformation process carried out under mild operating conditions in a subcritical water medium, the critical point occurring at 374° C. and 22.1 MPa in water. During the HTC process, the solution of carbohydrate precursors is usually heated to 130-250° C. under self-generated pressures. HTC has several advantages. First, a variety of sources with high moisture content of 75-90 wt % can be used. Second, HTC operates in water with a low reaction temperature. Third, the product generally exhibits uniform chemical and structural properties.

Carbon spheres can be produced through a hydrothermal process followed by a carbonization process. This can be carried out in an autoclave partially filled with the precursor solution. The autoclave is heated to a specific temperature for a given amount of time. The reaction temperature and pressure are below the critical point of water. The obtained solid product is separated by centrifugation and washed with water and ethanol to remove residual by-products such as levulinic acid.

In the $1^{st}$ step, the size and/or the surface hydrophilic functional groups of the hard template may be controlled by controlling the synthesis conditions of carbon spheres having a hydrophilic surface.

The hydrothermal synthesis temperature of carbon spheres may be 150° C. to 200° C., and the synthesis time may be 6 hours to 48 hours. After the hydrothermal synthesis of carbon spheres is completed, the drying temperature after washing may be in the range of 60° C. to 110° C.

The temperature of the hydrothermal synthesis may be appropriately generated in the range of 130 to 200° C. at a self-generated pressure. The yield of carbon spheres or the diameter of spheres may vary slightly depending on the temperature, but in this temperature range, the fundamental properties of the material do not change. Regarding the synthesis time, carbon spheres are formed under hydrothermal synthesis conditions within 48 hours. If the time is too long, the carbon spheres formed can bond together, which is not desirable for the shape of an ideal sphere.

The calcination temperature of the dried carbon spheres may be 200 to 500° C., and the time may be 1 to 5 hours. Calcination may be performed in a nitrogen atmosphere. Since it is a carbon material, it should not be calcinated in an air atmosphere.

If the carbon sphere is used again as a template under a hydrothermal atmosphere without calcining, it is a hydrothermal environment atmosphere similar to the conditions for synthesizing carbon spheres. Accordingly, it was observed that the residual substances attached to the carbon spheres remaining after washing in the hydrothermal synthesis of zeolite induce nucleation of the carbon spheres, and eventually the hard templates are bonded to each other, resulting in a form that deviates from the ideal spherical shape. On the other hand, the carbon spheres that have undergone calcination do not have the phenomenon of nucleation between spheres.

Further, when calcinating in a nitrogen atmosphere at too high a temperature (600° C. or more), carbonization deepens and changes to crystalline carbon (graphite), which is not oxidized even in the presence of oxygen at a very high temperature (for example, 700° C.), so there may be problems in the process of removing carbon spheres later.

By hydrothermal carbonization (HTC), carbon spheres can be produced with controlled size and oxygenated functional groups on the surface. Also, it has a high surface area and high thermal stability. Among the various methods for producing carbon spheres, hydrothermal carbonization is preferred because of its mild operating conditions. Further, hydrothermal carbonization can synthesize environmentally friendly micro- or nano-scale carbon spheres without the use of organic solvents, surfactants, or catalysts.

Carbon spheres synthesized by hydrothermal carbonization of carbohydrates, at least a part of which is represented by the general formula $(CH_2O)_n$, are hydrophilic amorphous carbons, with a hydrophobic core portion and a hydrophilic surface having a carbonyl functional group and a carboxylic acid functional group (FIG. 1B).

As a carbon source of the carbon sphere, saccharides such as glucose, sucrose, starch, and fructose may be used. Saccharides include monosaccharides, oligosaccharides, and polysaccharides.

The size and size distribution of colloidal carbon spheres prepared by HTC are affected by the process temperature, reaction time and concentration of the starting materials.

The colloidal carbon sphere particles may have a size of 1 to 100 μm, preferably a particle diameter of 2 to 10 μm.

Colloidal carbon spheres can be produced by HTC of glucose, usually at a temperature of 170-260° C. The minimum temperature for hydrothermal carbon formation from glucose is 160° C., and hydrothermal carbonization does not occur below 160° C., so there is almost no solid residue. The HTC carbon formed at 180° C. is rich in carbonyl functional groups. Increasing the HTC temperature produces hydrothermal carbon with a high degree of aromatization, which is a common trend in the carbonization process.

The process temperature affects the average diameter and size distribution of the carbonaceous particles. The higher the temperature, the more uniform the particle diameter and the more homogeneous the average size. At relatively low temperatures, glucose decomposes slowly. As the old nuclei begin to carbonize, new nuclei can form, resulting in different growth times. Therefore, the lower the temperature, the wider the size distribution. When the temperature is relatively high, glucose can be broken down very quickly. All nuclei occur simultaneously, leading to a more uniform average size. However, if the processing temperature is too high, there is a risk that the formed microspheres fuse together and become larger.

The diameter of carbon spheres can be controlled by controlling the molecular weight and concentration of carbohydrates having various molecular weights, such as monosaccharides, disaccharides, oligosaccharides, and polysaccharides.

The size of the carbon spheres increases with increasing concentration of the glucose solution within a certain concentration range. However, once the concentration is reached to some extent, the magnitude is constant. Also, the particle size distribution becomes larger due to the excessive concentration. On the one hand, a high concentration of carbon microspheres increases the possibility of crosslinking.

For HTC, there are various sources such as carbohydrates (glucose, fructose, xylose, sucrose, cellulose, and starch), biomass, sewage sludge, animal manure, municipal solid waste, agricultural residues, and algae. It is difficult for HTC in biomass to form carbon spheres in a regular form with a uniform chemical structure, compared to simple saccharides. A carbon source that can be hydrolyzed to glucose units is preferred. Under similar operating conditions, the diameter of the carbon microspheres depends on the type of saccharide used. The average diameter of carbon microspheres from different carbohydrates is in the order sucrose>starch>glucose. Carbon spheres formed by hydrothermal carbonization of pentose carbohydrates show morphological and chemical differences from carbon spheres formed by hydrothermal carbonization of hexose carbohydrates.

There are glucose and HMF for hexose-based monosaccharides, maltose and sucrose for disaccharides, and amylopectin and starch for polysaccharides.

The formation of acid during HTC is unavoidable, resulting in a lower pH value of ~3. This acidic condition tends to increase the reaction rate in HTC, because the hydronium ions ($H_3O^+$) produced in this acid promote dehydration and polymerization of HMF. A pH=1.5 solution may increase glucose breakdown.

In one embodiment, in the $1^{st}$ step, a carbon sphere template may be prepared by hydrothermal synthesis of glucose with a phloroglucinol additive.

According to the literature (*Carbon* 48.7 (2010): 1990-1998. Hydrothermal preparation of carbon microspheres from mono-saccharides and phenolic compounds), the addition of phloroglucinol can significantly change the size of the spheres, which was difficult by controlling the temperature, concentration, and time of hydrothermal synthesis. Further, when hydrothermal synthesis is performed using only glucose without additives, small spheres of 1 micrometer are combined in a peanut shape, which is not an ideal spherical shape.

[$2^{nd}$ Step of Preparing Zeolite Synthetic Gel]

Synthetic zeolite molecular sieves are prepared from an aqueous hydrothermal reaction mixture (synthetic mixture or synthetic gel) containing a suitable source of oxides. The organic template compound may be included in the hydrothermal reaction mixture for the preparation of molecular sieves having a desired structure, for example, MWW-type zeolite. Usually, a zeolite molecular sieve may be prepared from a hydrothermal reaction mixture, containing a source of alkali or alkaline earth metal (M), sodium or potassium, a cation, an oxide of a trivalent element X (e.g., aluminum), an oxide of a tetravalent element Y (e.g., silicon), an organic template compound and water and having a composition within the following range with respect to the molar ratio of oxides.

The components of the hydrothermal reaction mixture may be supplied by more than one source. The hydrothermal reaction mixture may be prepared batchwise or continuously. The crystal size and crystallization time of the zeolite in the present invention may vary depending on the properties of the hydrothermal reaction mixture used and the crystallization conditions.

The zeolite synthetic gel of the present invention contains carbon spheres with a hydrophilic surface, prepared in the $1^{st}$ step, as a hard template that determines the structure of zeolite, a silica source, an alumina source if necessary, and an organic template compound. For the synthetic gel, an aqueous solution containing water or alcohol such as ethanol may be used as a solvent.

In general, any form of crystalline material may be advantageous in facilitating synthesis for a new phase.

In the present invention, the carbon sphere having a hydrophilic surface may serve as seed crystals. Seed crystals have advantageous effects, for example, in controlling the particle size of the product, avoiding the need for organic template compound, accelerating synthesis, and improving the proportion of products of the intended framework type. In one embodiment of the present invention, synthesis is facilitated by the presence of 1 to about 25%, preferably about 1 to about 5% by weight of the seed crystals based on the total amount of tetrahedral elemental oxide (e.g., silica) in the hydrothermal reaction mixture.

The silica source is a silicon precursor, which is a main component for zeolite, and preferably silicic acid, tetraethyl orthosilicate (TEOS, $Si(OC_2H_5)_4$), sodium silicate ($Na_2SiO_3$), etc. may be used. Further, although there is no particular limitation, a gel or aqueous solution containing $SiO_2$ (silica gel or water glass ($SiO_2+Na_2O$), silica sol), fumed silica, tetraethyl orthosilicate (TEOS, $Si(OC_2H_5)_4$), tetrapropyl orthosilicate (TPOS, $Si(OC_3H_7)_4$), etc. may be used.

The alumina source (aluminum source) is an aluminum precursor and sodium aluminate ($NaAlO_2$), aluminum isopropoxide ($Al(O(CH(CH_3)_2)))$, aluminum oxide, etc. can be used. Further, although there is no particular limitation, aluminum alkoxide, aluminum nitrate ($Al(NO_3)_3$), aluminum sulfate ($Al_2(SO_4)_3$), aluminum chloride ($AlCl_3$), boehmite (AlOOH) and aluminum hydroxide ($Al(OH)_3$) may be used. Preferably, the aluminum precursor may be an aluminum precursor containing an alkali metal so that acid sites can be formed on the zeolite support through ion exchange, and more preferably, an aluminum precursor containing Na may be used.

The zeolite synthetic gel can be prepared by dissolving the carbon spheres having a hydrophilic surface of the present invention, a silica source, if necessary, an alumina source and an organic template compound in an appropriate ratio in water to make a gel-like solution without a precipitate. For the synthetic gel, an aqueous alkali solution in which a small amount of NaOH is dissolved may be used to control acidity.

If the structure directing agent (SDA) is changed, the fundamental structure (type) of the zeolite is changed.

As the structure directing agent (SDA), the organic template compound may include ammonium or amine, and specifically, depending on the structure of the zeolite crystal to be prepared, ammonium salts in which ammonium cations such as tetramethylammonium (TMA, $(CH_3)_4N$), tetraethylammonium (TEA, $(C_2H_5)_4N$), tetrapropylammonium (TPAOH, $(C_3H_7)_4N$), tetrabutylammonium (TBA, $(C_4H_9)_4N$)) are combined with anions such as hydroxide (OH), bromine (Br), and chlorine (Cl); and amines such as n-butylamine (BTA, $CH_3(CH_2)_3NH_2$), ethylamine (ETA, $CH_3CH_2NH_2$), isopropylamine (IPA, $(CH_3)_2CHNH_2$), or ethylenediamine (EDA, $NH_2CH_2CH_2NH_2$) may be used.

HMI (hexamethyleneimine) can be used as an organic template compound for forming MWW-type zeolite crystals including MCM-22. In addition, the Si/Al ratio (silicon aluminum ratio) for MCM-22 crystal synthesis is 10 to 200.

For the preparation of the synthetic gel, the order of mixing the hard template carbon sphere, silica source, alumina source, and organic template compound into water is not limited, but preferably, an aqueous solution is prepared by first dissolving the alumina source in water or aqueous alkali solution, and when it is confirmed that all is dissolved, a silica source and an organic template compound are administered, and after stirring, a hard template is added and stirred. A gel-like solution can be obtained, and the gel-like solution can be aged while stirring at room temperature for 1 hour to 7 days, preferably 3 hours to 24 hours.

Although the mixing ratio is not limited, it is preferably prepared in a mixing ratio of 0.1 to 1 molar ratio of silicon/organic template compound and 0.1 to 5 molar ratio of alkali metal/aluminum.

[The $3^{rd}$ Step of Synthesizing Zeolite Hollow Spheres]

After the components of the hydrothermal reaction mixture, which is a synthetic gel, are properly mixed with each other, the hydrothermal reaction mixture is subjected to appropriate crystallization conditions. These conditions usually include heating the hydrothermal reaction mixture to an elevated temperature, possibly with stirring.

The crystallization of the zeolite can be carried out under static or stirring conditions in a reactor vessel, such as an autoclave. Useful ranges of crystallization temperatures are those temperatures of from about 100 to about 250° C. for a period of time sufficient for crystallization to occur at the temperature employed, such as from about 1 to about 400 hours. Preferably, the crystallization temperature ranges from about 135 to about 180° C. for a period of time sufficient for crystallization to occur at the temperature used, such as from about 1 to about 200 hours.

The hydrothermal reaction can be carried out with any type of agitation, such as stirring or rotating the vessel about a horizontal axis (tumbling) or without agitation (statically). The speed of the agitation may be 0 to about 60 rpm. The crystals are then separated from the liquid and recovered.

The present invention can synthesize hollow spheres in which zeolite crystals grow to form a macropore framework through a hydrothermal crystallization process using the hydrophilic surface of the carbon spheres as a hard template.

The $3^{rd}$ step is a step for hydrothermal synthesis after putting the synthetic gel of the $2^{nd}$ step into a high-pressure isothermal reactor. It is possible to control the degree of crystallization of zeolite according to the temperature, pressure, and reaction time of hydrothermal synthesis.

In the present invention, by using the hydrophilic surface of carbon spheres as a hard template, the zeolite framework forming the walls of the hollow spheres formed in the $3^{rd}$ step may have a pore structure formed by an ordered, porous crystalline zeolite material in which a plurality of channels or pores are interconnected.

During hydrothermal synthesis, the pressure in the reactor is determined depending on the type and amount of synthetic gel to be input but may preferably be 0.5 to 10 MPa.

Depending on the volume of the zeolite synthesis solution in the autoclave, it can have a significant influence on the formation of silica crystals around the carbon spheres. This is because the self-generated pressure varies depending on the volume of the empty space in the autoclave. For example, when 80% of the autoclave was loaded, the cleanest spherical zeolite was obtained.

The reaction time of the hydrothermal synthesis may be 6 hours to 20 days, preferably 3 days to 14 days, but is not limited thereto.

When an alkali metal-containing aluminum precursor is used as an aluminum precursor in the synthetic gel of the $2^{nd}$ step, an alkali metal-zeolite (e.g., Na-zeolite) can be obtained in the $3^{rd}$ step. In this case, to prepare the zeolite support according to the present invention, the alkali metal-zeolite obtained in the $3^{rd}$ step may further be subjected to exchanging the alkali metal with proton ions and calcining to convert the alkali metal into H-zeolite having an acid site.

For example, Na bound to the aluminum site in the zeolite structure obtained in the $3^{rd}$ step is ion-exchanged to $NH_4$ in an aqueous solution in which ammonium nitrate ($NH_4NO_3$) is dissolved, to produce a zeolite in the form of $NH_4$ bonded to the aluminum site in the mesoporous zeolite structure. After this, it can be calcined to form H-zeolite. At this time, the concentration of ammonium nitrate is not limited, but may preferably be 0.5 to 2 molar concentration.

At this time, the time of the ion exchange reaction is not limited, but may preferably be 1 to 12 hours, and the temperature of the ion exchange reaction is not limited, but may preferably be room temperature to 90° C. The number of times of the ion exchange reaction is not limited but may preferably be 1 to 3 times.

The hydrothermal synthesis temperature for synthesizing MCM-22 hollow spheres (HS-MCM-22) may be 130° C. to 200° C., and the time may be 3 days to 14 days.

According to the present invention, when a carbon sphere having a hydrophilic surface is used as a hard template to facilitate silica crystal growth, a hollow sphere structure of zeolite other than MCM-22 zeolite can be obtained.

[The $4^{th}$ Step of Removing the Carbon Sphere Used as a Hard Template]

The $4^{th}$ step is to remove the organic template compound and the hard template by washing and calcining the hydrothermal synthesis product. In the $4^{th}$ step, the calcination temperature may be 500 to 700° C. For example, the washing is performed by centrifugation or filtration with tertiary distilled water, and the solid material remaining after washing 3 to 10 times is dried at 60 to 110° C. for 3 to 24 hours under reduced pressure to atmospheric conditions, and then the remaining moisture, organic template compound and hard template are all removed by calcination at 400 to 600° C. in air.

After crystallization of the hydrothermal reaction mixture is complete, a crystalline product can be recovered from the remainder of the hydrothermal reaction mixture, in particular its liquid content. Such recovery may include filtering the crystals and washing these crystals with water. However, in order to remove from the crystals the entire undesired residue of the hydrothermal reaction mixture, it is necessary to subject to high temperature calcination, for example at 500° C., possibly in the presence of oxygen. This calcination treatment serves not only to remove water from the crystals, but also to decompose and/or oxidize residues of organic template compounds that may clog in the pores of the crystals and possibly occupy ion exchange sites therein.

In one embodiment of the present invention, the crystalline MCM-22 family molecular sieve comprises one or more of MCM-22, MCM-49, or MCM-56; inner growth-phase of MCM-22 and/or MCM-49 and/or MCM-56; or a mixed phase of MCM-22 and/or MCM-49 and/or MCM-56. The molecular sieve product from the synthesis may be further filtered, washed with water and/or dried. The crystalline molecular sieve formed by crystallization is recovered and may be subjected to further processing such as ion-exchange with an ammonium salt (e.g., ammonium hydroxide, ammonium nitrate, ammonium chloride, ammonium sulfate, ammonium phosphate, ammonium carbonate, or any combination thereof) under an oxidizing atmosphere (e.g., gas having an oxygen partial pressure greater than 0 kPa-a, or air) at a temperature of above 200° C., preferably at least 300° C., more preferably at least 400° C. and most preferably at least 500° C.; and/or calcination.

After the hydrothermal synthesis of HS-MCM-22 is completed, the temperature for drying after washing may be between 60° C. and 110° C. The temperature for calcinating the dried powder may be 400° C. to 600° C., and the time may be 2 hours to 24 hours.

[Zeolite Hollow Spheres in which Zeolite Crystals Grow to Form Macropore Framework According to the Present Invention]

The total surface area of the zeolite molecular sieve without moisture, organic template compound and hard template can be measured by the Brauner-Emmett-Teller (BET) method using adsorption-desorption (at temperature of liquid nitrogen, 77 K). The internal surface area can be calculated using the t-plot of the BET measurement. The outer surface area is calculated by subtracting the inner surface area from the total surface area measured by the BET measurement.

The zeolite hollow spheres of the present invention (after calcination) have a total surface area (sum of external and internal surface areas, measured by BET method) of more than 450 $m^2/g$, preferably more than 475 $m^2/g$, more preferably more than 500 $m^2/g$, even more preferably more than 600 $m^2/g$.

MCM-22 is a zeolite in which mesopores may be formed during synthesis, and mesopores may be additionally formed in the process of forming the macropore framework, but as a result of examining the BET analysis (argon physisorption) of the MCM-22 type hollow spheres synthesized in one embodiment of the present invention, the formation of additional mesopores was not observed.

[Formation of the Zeolite Hollow Sphere of the Present Invention and its Use]

The zeolite hollow spheres of the present invention can be used as a catalyst, catalyst support, adsorbent, ion exchanger or absorber.

In addition to zeolitic molecular sieves, amorphous materials, mainly silica, aluminum silicate and aluminum oxide, have been used as adsorbents and catalyst supports. There are various forming techniques, such as spray drying, prilling, pelletization and extrusion. These various forming techniques have been used to produce macrostructures, for example, in the form of spherical particles, extrudates, pellets, and tablets of porous materials for catalysts, adsorption and ion exchange.

The original metal cations of the zeolite hollow spheres of the present invention can be replaced, at least in part, by ion exchange with other cations according to techniques well known in the art. Preferably, replacement cations include metal ions, hydrogen ions, hydrogen precursors such as ammonium, and mixtures of such ions. Particularly preferred cations are those suitable for catalytic activity for specific hydrocarbon conversion reactions. These include hydrogen, rare earth metals, and metals of groups 1 to 17, preferably groups 2 to 12 of the periodic table.

The walls of the zeolite hollow spheres of the present invention may preferably be MCM-22 based molecular sieves, and generally must be at least partially dehydrated when used as adsorbents or catalysts in organic compound conversion processes. This can be carried out by heating in an atmosphere such as air or nitrogen, and at atmospheric pressure, subatmospheric or superatmospheric pressure, to a temperature such as 200 to 595° C., for 30 minutes to 48 hours. The degree of dehydration is determined by the percentage of weight loss compared to the total weight loss of the molecular sieve sample at 595° C. under flowing dry nitrogen (less than 0.001 kPa partial pressure of water vapor) for 48 hours. Also, dehydration can be carried out at room temperature (about 25° C.) only by placing the silicate under vacuum, but a longer time is required to obtain a sufficient amount of dehydration.

When used as a catalyst, the walls of the zeolite hollow spheres of the present invention, preferably the MCM-22 family molecular sieve, generally must be subjected to a heat treatment to remove some or all of any organic constituents. The walls of the zeolite hollow spheres of the present invention, preferably the MCM-22 family molecular sieve, are also in intimate combination with hydrogenation components such as tungsten, vanadium, molybdenum, rhenium, nickel, cobalt, chromium, manganese, or noble metals such as platinum or palladium, and thus it can be used as a catalyst in which the hydrogen-dehydrogenation function is implemented. Such components may be present in the composition by co-crystallization, or by exchanging, impregnating into, or intimately physically mixing with the composition such that a Group 13 element, such as aluminum, is present in the structure. These components can be impregnated into or on top of, for example, platinum by treating the silicate with a solution containing platinum metal-containing ions. Accordingly, platinum compounds suitable for this purpose include chloroplatinic acid, chloroplatinum, and various compounds containing platinum amine complexes.

The wall of the zeolite hollow spheres of the present invention, preferably the MCM-22 family molecular sieve, in particular its metal, hydrogen and ammonium forms can be advantageously converted to other forms by heat treatment. This heat treatment is generally carried out by heating one of these forms at a temperature of at least 370° C. for a period of at least 1 minute and generally up to 1000 hours. Although sub-atmospheric pressure may be used for the heat treatment, atmospheric pressure is preferred for convenience. The heat treatment may be performed at a temperature of about 925° C. or less. The heat-treated products are particularly useful in the catalysis of certain hydrocarbon conversion reactions. The heat-treated products, particularly their metal, hydrogen and ammonium forms, are particularly useful for the catalysis of certain organics, such as hydrocarbon conversion reactions.

The zeolite hollow spheres of the present invention can be shaped into various particle sizes. In general, the particles may be in the form of powders, granules, or shaped articles, such as extrudates. When the catalyst is molded, for example by extrusion, the crystals may be extruded before drying, or partially dried and then extruded.

The wall of the zeolite hollow spheres of the present invention, preferably the MCM-22 family molecular sieve, can be used, for example, as an adsorbent for separating one or more components from a mixture of components in the gaseous or liquid phase which have sorption properties that are different for the crystalline molecular sieves of the present invention. Thus, when contacting a mixture of components having sorption properties that are differential with respect to the crystalline molecular sieve of the present invention with the crystalline molecular sieve to optionally absorb one component, at least one component from the mixture is partially or substantially entirely can be separated.

The walls of the zeolite hollow spheres of the present invention, preferably the MCM-22 family molecular sieve, are useful as catalysts in various processes, such as separation processes and hydrocarbon conversion processes. In this case, it may be used in combination with one or more other catalytically active materials (e.g., other crystalline catalysts).

Non-limiting examples of separation processes and hydrocarbon conversion processes include (i) alkylation of aromatic hydrocarbons (e.g., benzene) using long-chain olefins (e.g., $C_{14}$ olefins) to obtain long-chain alkyl aromatics, which can be subsequently sulfonated to give synthetic detergents; (ii) alkylation of aromatic hydrocarbons with gaseous olefins to yield short chain alkyl aromatics; (iii) alkylation of reformates with significant amounts of benzene and toluene, using fuel gas containing $C_5$ olefins, in particular to yield mono- and di-alkylates; (iv) alkylation of aromatic hydrocarbons (such as benzene, toluene, xylene and naphthalene) with long chain olefins (such as $C_{14}$ olefins) to yield an alkylated aromatic lubricating base stock; (v) alkylation of phenols with olefins or equivalent alcohols to yield long chain alkyl phenols; (vi) conversion of light paraffins to olefins and aromatics; (vii) conversion of light olefins to gasoline, distillate and lubricant hydrocarbons; (viii) two-stage hydrocracking to upgrade a hydrocarbon stream having an initial boiling point greater than about 260° C. to a top distillate and gasoline boiling product; (ix) a combined hydrocracking/dewaxing process; (x) reaction of alcohols with olefins to yield mixed ethers, such as reaction of methanol with isobutene and/or isopentene to yield methyl-t-butyl ether (MTBE) and/or t-amyl methyl ether (TAM); (xi) toluene disproportionation using C9+ aromatics as co-feed; (xii) reacting isobutyl benzene with propylene oxide to give the intermediate 2-(4-isobutylphenyl)propanol, followed by oxidation of the alcohol to give the corresponding carboxylic acid, 2-(4-isobutylphenyl)propionic acid (i.e., ibuprofen), which is a pharmaceutically-active compound; (xiii) preparing a substantially salt-free reactive dye-containing solution using an amine as an acid-binding agent when reacting with heterocyclic fiber-reactive components in the preparation of a dye; (xiv) an absorption process to separate 2,6-TDI from isomers if TDI is present; (xv) an absorption process to separate 2,4-TDI from isomers; and (xvi) reducing the durene content of the 90-200° C. basis fraction obtained from the catalytic conversion of methanol to gasoline.

The wall of the zeolite hollow spheres of the present invention, preferably the MCM-22 family molecular sieve, can be used in a process for the simultaneous production of phenols and ketones, which proceeds through benzene alkylation, followed by the formation of alkylbenzene hydroperoxide, and the splitting of the alkylbenzene hydroperoxide into phenols and ketones. That is, it is used in benzene alkylation. Examples of such processes include conversion of benzene and propylene to phenol and acetone, conversion of benzene and C4 olefins to phenol and methyl ethyl ketone, conversion of benzene, propylene and C4 olefins to phenol, acetone and methyl ethyl ketone (in which the subsequent conversion of phenol and acetone to bis-phenol-A is possible), or conversion of benzene to phenol and cyclohexane, or conversion of benzene and ethylene to phenol and methyl ethyl ketone.

The wall of the zeolite hollow spheres of the present invention, preferably the MCM-22 family molecular sieve, is useful for benzene alkylation reaction requiring selectivity to monoalkylbenzene. Moreover, the walls of the zeolite hollow spheres of the present invention, preferably the MCM-22 family molecular sieve, are particularly useful for the selective production of s-butylbenzene from linear butene-rich benzene and C4 olefin feeds.

The walls of the zeolite hollow spheres of the present invention, preferably the MCM-22 family molecular sieve, are also useful catalysts for transalkylation, such as for polyalkylbenzene transalkylation.

For many catalysts, it is desirable to incorporate the zeolite hollow spheres of the present invention into the organic conversion process along with other materials that are resistant to the temperature and other conditions employed. Such materials include active and inactive materials and synthetic or natural zeolites, as well as inorganic materials such as clays, silica and/or metal oxides such as alumina.

According to the present invention, zeolite (preferably MCM-22-based molecular sieve) hollow spheres having pore structure can be used for various purposes, such as a catalyst and an adsorbent. For example, it can be used as a catalyst for hydrocarbon conversion in alkylation, toluene disproportionation, and xylene isomerization.

Hereinafter, the present invention will be described in more detail through examples. These examples are for illustrative purposes only, and it will be apparent to those of ordinary skill in the art that the scope of the present invention is not construed as being limited by these examples.

Materials

D-(+)-glucose (G8270) and phloroglucinol (79330) (melting point: 219° C.) were purchased from Sigma-Aldrich and used.

Example 1

(1-1) preparing glucose+phloroglucinol (1:1 mol) 0.5 M solution,
(1-2) filling 50% of Teflon-lined autoclave;
(1-3) performing hydrothermal synthesis at 200° C. for 12 hours and quenching after completion of hydrothermal synthesis,
(1-4) repeating until the filtered solution becomes transparent after washing and centrifugation;
(1-5) overnight drying, and
(1-6) calcining in a nitrogen atmosphere and purifying carbon spheres.

Figure 2A:
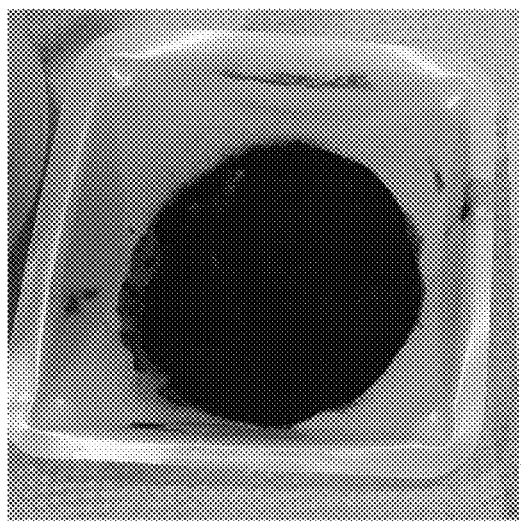
FIG. 2A is a photograph of the carbon spheres (CS) prepared in Example 1.
Figure 2B:
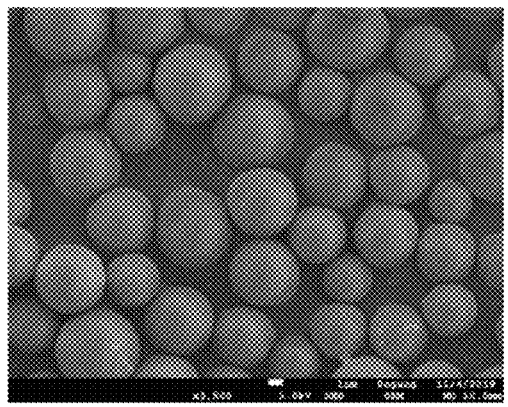
FIG. 2B is a SEM image of the carbon spheres prepared in Example 1.
Figure 2B:
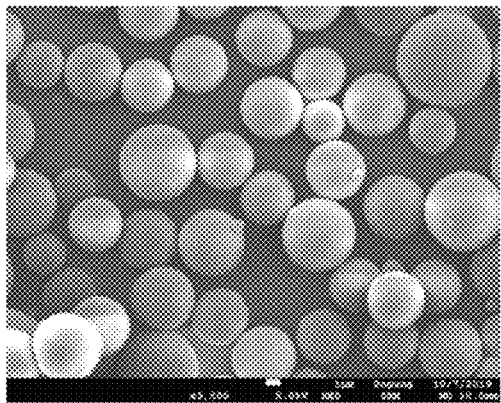

The black powder obtained through the above steps was named 'CS', and its photograph and SEM image are shown in FIG. 2, and its FT-IR spectrum is shown in FIG. 1A.

From this, it was confirmed that in Example 1, carbon spheres having hydrophilic groups such as —OH and C=O were synthesized.

Example 2

(2-1) dissolving $NaAlO_2$ (56% Al) and NaOH in distilled water,
(2-2) when the solution becomes transparent, administering silicic acid and HMI (hexamethyleneimine),
(2-3) After stirring for 30 minutes, administering the carbon spheres synthesized in Example 1 by 10 wt % of the solution, followed by stirring overnight (herein, the molar ratio of the solution is $SiO_2$: 0.066 $Al^{3+}$: 0.250 Na+: 0.5 HMI: $45H_2O$),
(2-4) filling 80% of the Teflon-lined autoclave, and adding a Teflon ball (agitator),
(2-5) performing hydrothermal synthesis (rotating system, 60 rpm) at 150° C. for 7 days, followed by quenching after completion,
(2-6) washing with water and ethanol, centrifuging, and repeating until the pH of the centrifuged solution drops to 9 or less,
(2-7) drying overnight,
(2-8) calcinating for 12 hours at 580° C. with air flow.

The compound obtained at step (2-7) was named 'MCM-22(P)/CS', and the compound obtained at step (2-8) was named 'HS-MCM-22.' It may be called Na-HS-MCM-22, H-HS-MCM-22, etc. depending on the type of cation through subsequent ion exchange process.

Comparative Example 1

MCM-22 was prepared in the same manner as in Example 2 except for the step of administering the carbon spheres synthesized in Example 1.

Figure 4:
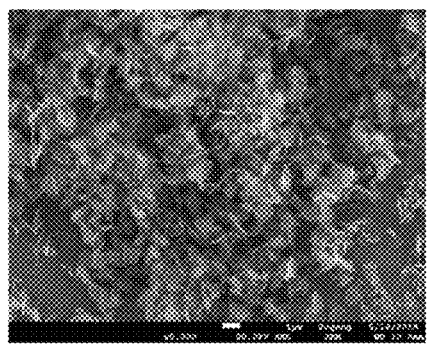
FIG. 4 is an SEM image of conventional MCM-22 and HS-MCM-22 prepared in Example 2.
Figure 4:
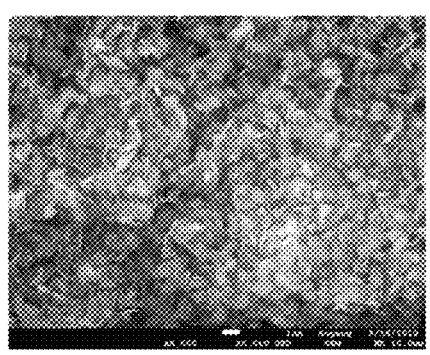
Figure 4:
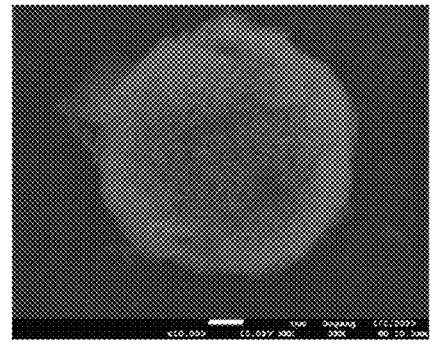
Figure 4:
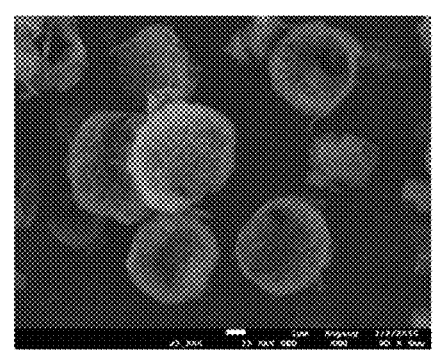

FIG. 4 is a comparison of SEM images of MCM-22 prepared in Comparative Example 1 and HS-MCM-22 prepared in Example 2. From FIG. 4, it was confirmed that general MCM-22 zeolite particles (Comparative Example 1) form a spherical surface framework of HS-MCM-22 (Example 2).

Figure 5:
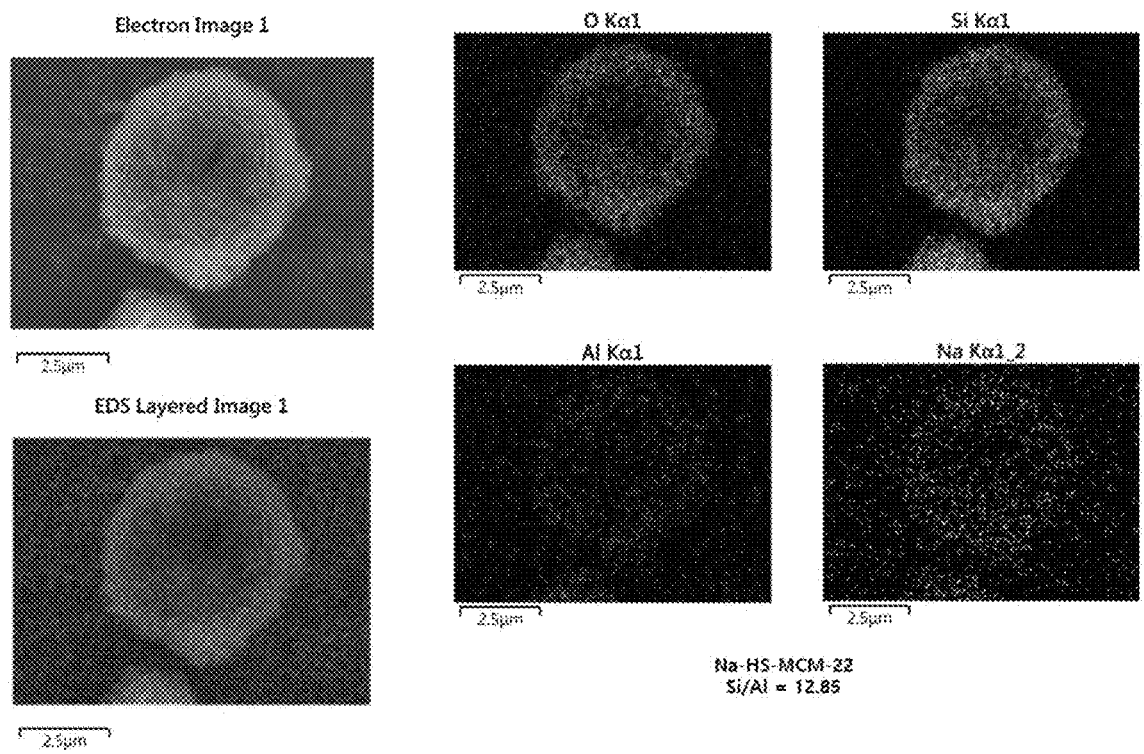
FIG. 5 is a SEM-EDS of HS-MCM-22 prepared in Example 2.
Figure 6:
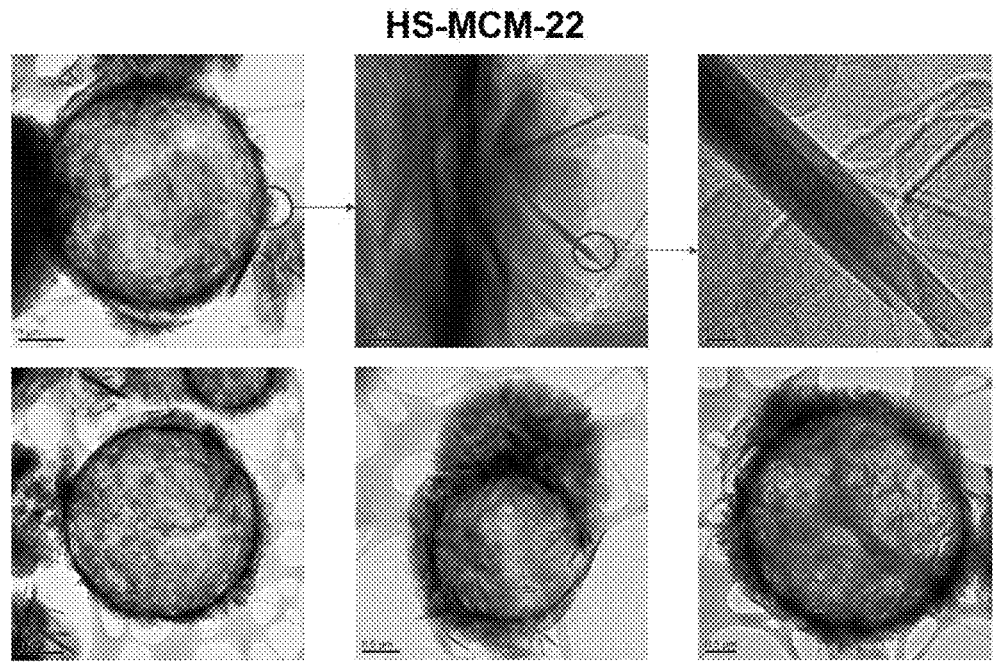
FIG. 6 is a TEM image of the HS-MCM-22 prepared in Example 2.

The SEM-EDS image of 'HS-MCM-22' is shown in FIG. 5, and the TEM image is shown in FIG. 6.

From FIG. 5, it was confirmed that the zeolite particles form a hollow sphere framework. Furthermore, in FIG. 6, it was confirmed that the MCM-22 zeolite particles formed the framework of a hollow sphere, and it was confirmed that the inside of the sphere was empty as the inside was transparently reflected.

Specifically, the complete MCM-22 structure is not formed immediately after hydrothermal synthesis, and the material in this state is mainly referred to as the MCM-22 precursor (MCM-22(P)). When this is calcined in the presence of oxygen, residual materials such as internal organic template compounds are removed, the bonds within the zeolite become stronger, and a complete MCM-22 structure is formed, which is called MCM-22.

Although it depends on the type of counter cation, the cation added to hydrothermal synthesis is sodium, so it is called Na form MCM-22 (abbreviated as Na-MCM-22).

Immediately after the hydrothermal synthesis, the MCM-22(P) particles were attached to the carbon sphere, so it was named MCM-22(P)/CS. The process of forming the complete structure of the MCM-22 precursor is heat treatment in an oxygen (air) atmosphere, and accordingly, it is possible to obtain the effect that the carbon spheres are also removed. That is, it can be said that the process of transition from MCM-22(P) to Na-MCM-22 from the color change of the powder (photos in FIGS. 7a and 7b) and the process of removing carbon spheres occur simultaneously.

Figure 7A:
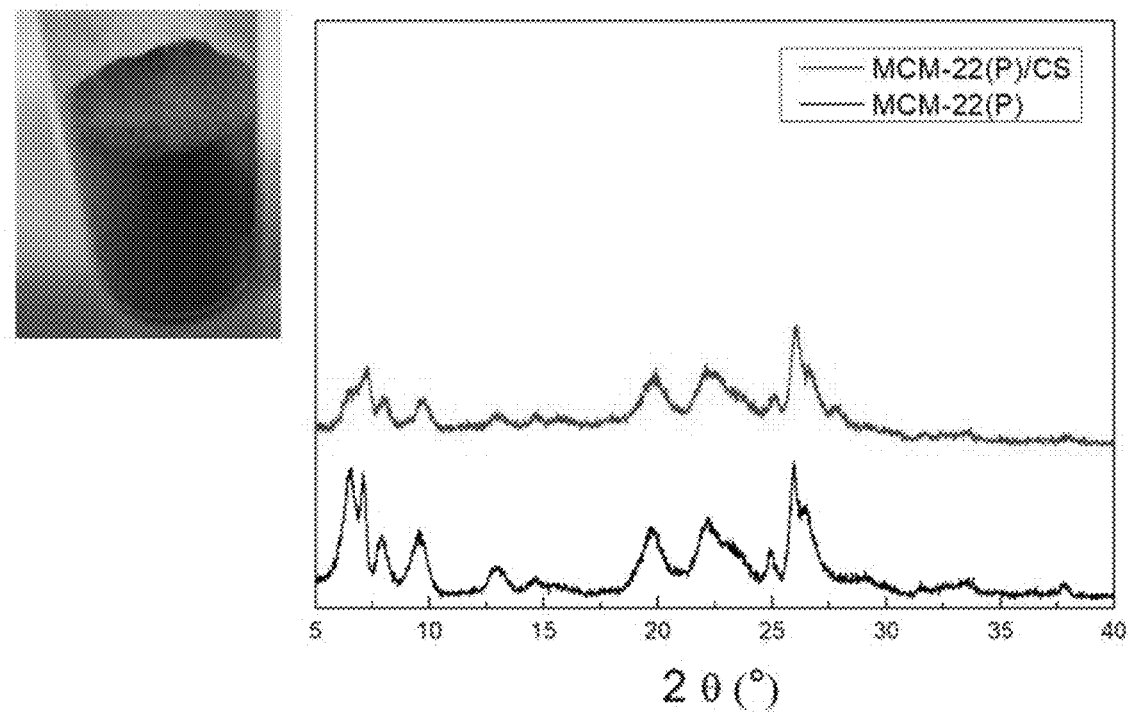
FIG. 7A is an XRD comparison of MCM-22(P)/CS prepared in Example 2 and MCM-22(P) prepared without a hard template.

From FIG. 7A, it was confirmed that MCM-22(P)/CS exhibited the same crystal structure as MCM-22(P).

Figure 7B:
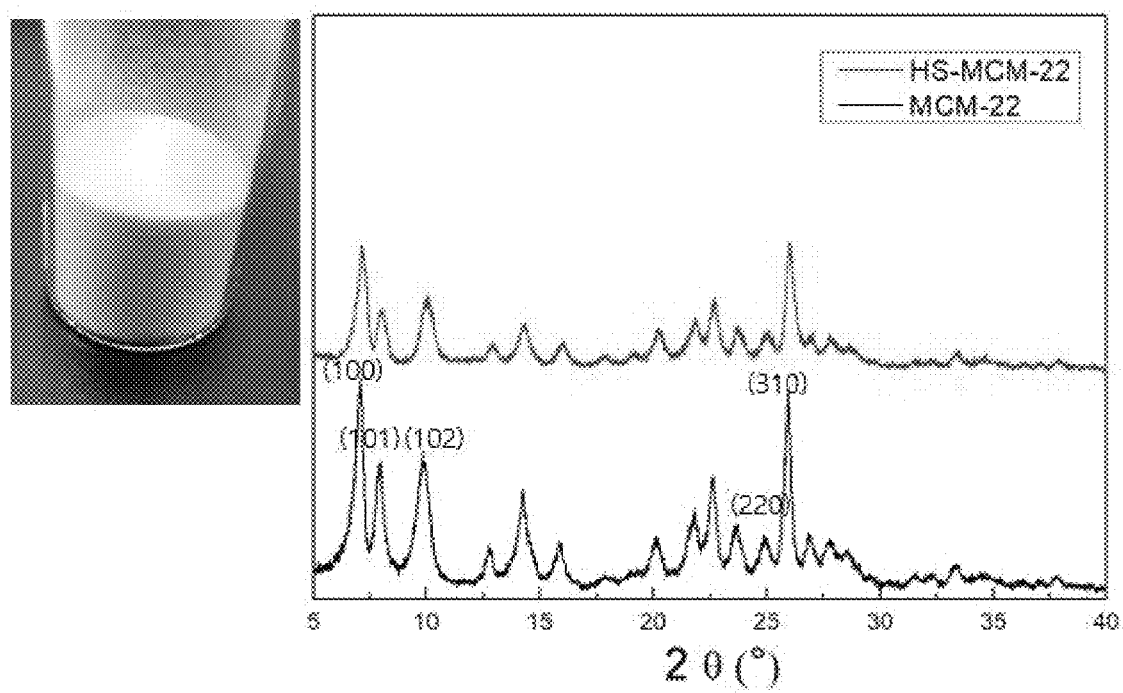
FIG. 7B is XRD comparing HS-MCM-22 and MCM-22 prepared in Example 2.

It was confirmed from FIG. 7B that HS-MCM-22 also exhibited the same crystal structure as MCM-22. Since the same XRD spectrum as that of the reference material known as MCM-22 was observed, the material synthesized in Example 2 can be referred to as MCM-22 zeolite, even though it was synthesized in the presence of a hard template.

Comparing the XRD patterns of FIGS. 7A and 7B, it can be seen that the crystallinity of the MCM-22(P) state is slightly insignificant, but when the calcination is completed into the MCM-22 state, the crystallinity is remarkable. This is a unique characteristic of the MCM-22. That is, the result of Example 2 (red line) has no specificity in crystallinity compared to the reference (black) even when the hard template is added, and this zeolite has an XRD pattern unique to MCM-22.

FIG. 5 is a SEM-EDS of HS-MCM-22 prepared in Example 2.

EDS analysis can confirm the elemental distribution of the material, and it shows that Si, Al, Na, and O, which are the basic elements of zeolite, are evenly distributed. In addition, as a result of measuring the ratio of Si and Al atoms, it was synthesized close to the original target value of 15.

Figure 8A:
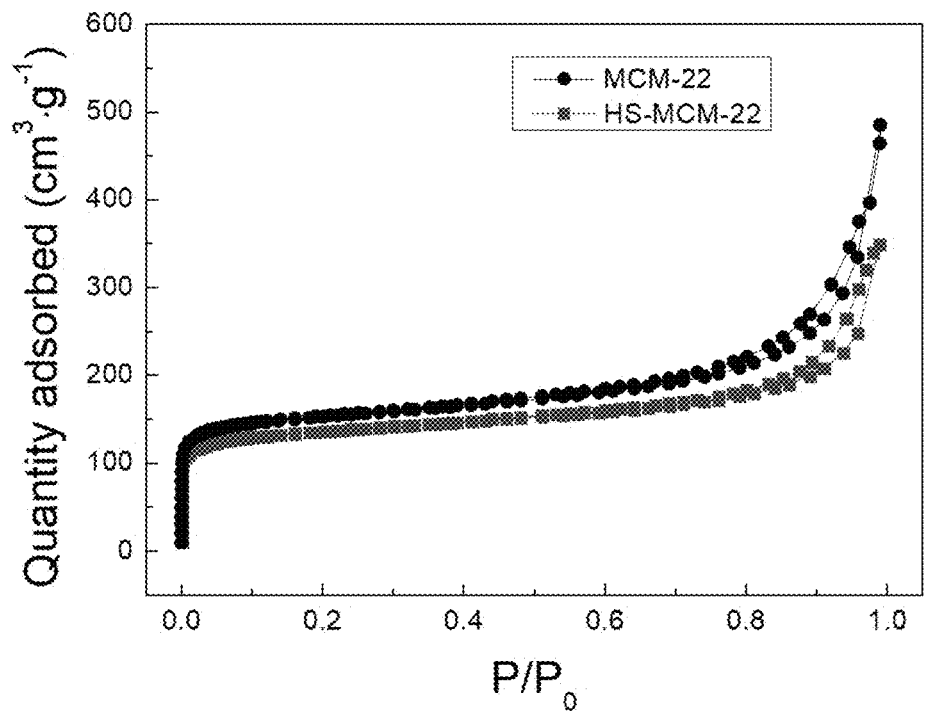
FIG. 8A is Ar physorption isotherms comparing HS-MCM-22 and MCM-22 prepared in Example 2.

FIG. 8A is an Ar physisorption isotherm of argon physisorption analysis performed to analyze specific surface area and pore characteristics of general MCM-22 of Comparative Example 1 and HS-MCM-22 prepared in Example 2. Table 1 summarizes the specific surface area and internal pore volume of the material calculated in this analysis.

TABLE 1

| Sample | $S_{BET}$ (m$^2 \cdot$ g$^{-1}$) | $S_{ext}^{a}$ (m$^2 \cdot$ g$^{-1}$) | $V_{total}^{b}$ (cm$^3 \cdot$ g$^{-1}$) | $V_{micro}^{c}$ (cm$^3 \cdot$ g$^{-1}$) |
|---|---|---|---|---|
| MCM-22 | 501 | 124 | 0.49 | 0.19 |
| HS-MCM-22 | 454 | 113 | 0.31 | 0.17 |

$^a$calculated by t-plot method
$^b$calculated by DFT method
$^c$calculated by H-K method From Table 1, the ratio of specific surface area/external surface area is similar, and the texture properties of MCM-22 and HS-MCM-22 show similar values.

Since this does not affect the crystal structure of the zeolite even if a hard template is added, it can be seen that the internal micropores have characteristics similar to those of general MCM-22.

Figure 8B:
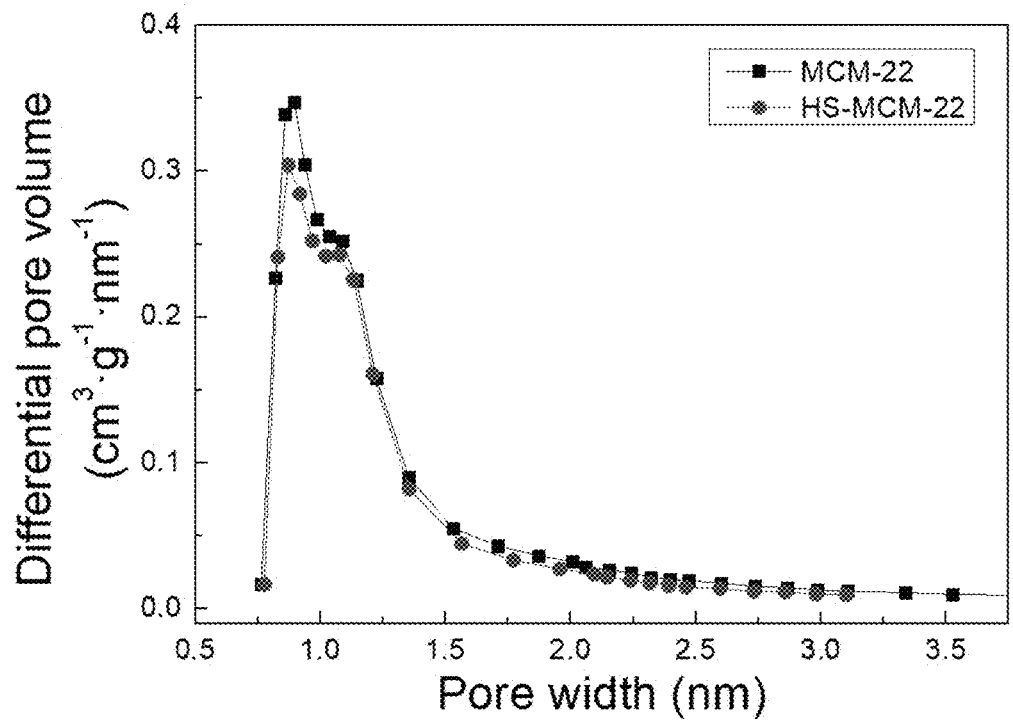
FIG. 8B is a micropore distribution diagram of HS-MCM-22 and MCM-22 calculated based on argon physisorption analysis.

FIG. 8B is a graph depicting the distribution of micropores based on argon physisorption analysis. It was confirmed that the micropore distribution of general MCM-22 and synthesized HS-MCM-22 was the same.

In summary, it can be seen from Table 1 and FIG. 8 that MCM-22 and HS-MCM-22 prepared in Example 2 have similar pore distributions exhibited by micropores formed by crystals of zeolite.

Figure 9:
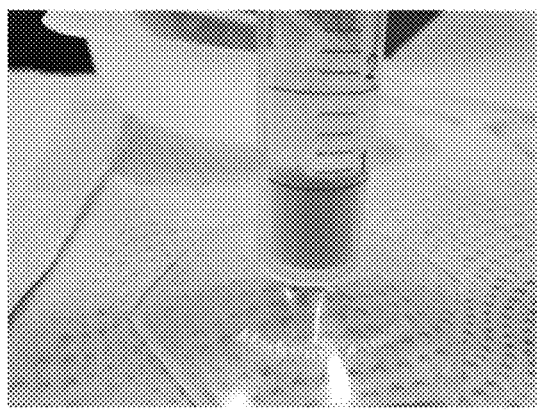
FIG. 9 is a photograph comparing the apparent densities of HS-MCM-22 and MCM-22 prepared in Example 2.
Figure 9:
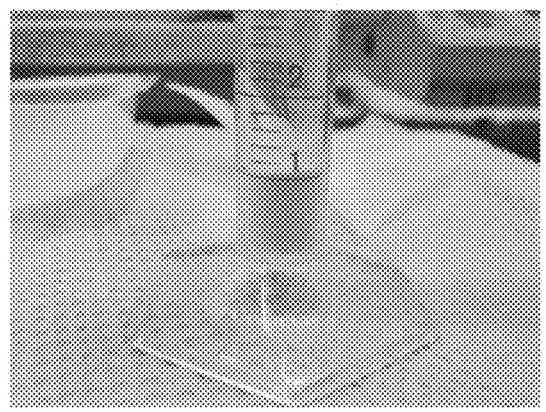

Since the HS-MCM-22 hollow spheres of Example 2 have macropores, the apparent density can be predicted to be much lower than that of general MCM-22, and when actually measured, as shown in FIG. 9, it was confirmed that the apparent density of HS-MCM-22 hollow spheres was lowered to about ⅓ of that of general MCM-22.

As described above, specific parts of the present invention have been described in detail, and it will be apparent to those of ordinary skill in the art that these specific techniques are only preferred embodiments, and the scope of the present invention is not limited thereby. Therefore, it will be said that the practical scope of the present invention is defined by the appended claims and their equivalents.

What is claimed is:

1. A method of producing zeolite hollow spheres in which zeolite crystals, having pore structures including mesopores and micropores, grow to form a macropore framework, comprising:
   1$^{st}$ step of preparing non-porous carbon spheres having a hydrophilic surface, which are synthesized by hydrothermal carbonization of a carbohydrate, at least a part of which is represented by the general formula (CH$_2$O)$_n$;
   2$^{nd}$ step of preparing a zeolite synthetic gel containing the carbon spheres having the hydrophilic surface of the 1$^{st}$ step as a hard template, a silica source, and an organic template compound;
   3$^{rd}$ step of synthesizing the zeolite hollow sphere in which a zeolite crystal, having pore structures including mesopores and micropores, grows to form the macropore framework, which is the outer wall of the hollow sphere, through a hydrothermal crystallization process using the hydrophilic surface of the carbon sphere as a hard template; and
   A 4$^{th}$ step of removing the carbon sphere used as the hard template.

2. The method of claim 1, wherein the 1$^{st}$ step further comprises preparing amorphous carbon spheres through washing, drying, and calcining after hydrothermal synthesis.

3. The method of claim 1, wherein the 3$^{rd}$ step further comprises growing zeolite crystals through a hydrothermal crystallization process using the hydrophilic surface of the carbon sphere as a hard template and using silicic acid of Formula 1 below as a silica source, to form the framework for the macropore

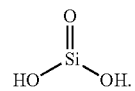

[Formula 1]

4. The method of claim 1, wherein the macropore framework forming the wall of the hollow sphere, formed in the 3$^{rd}$ step, is an ordered, porous crystalline zeolite material with a number of channels or pores interconnected, which has pore structures including mesopores and micropores.

5. The method of claim 4, wherein the porous crystalline zeolite material is one of zeolites designated as having a MWW structure.

6. The method of claim 1, wherein the carbon spheres having the hydrophilic surface in the 1$^{st}$ step are synthesized by hydrothermal carbonization of a hexose-based hydrocarbon together with a phloroglucinol additive.

7. The method of claim 1, wherein the 1$^{st}$ step further comprises controlling the size and/or surface hydrophilic functional groups of the hard template by controlling the synthesis conditions for hydrophilic carbon spheres.

8. The method of claim 1, further comprising the step of shaping the zeolite hollow spheres into particle sizes in the form of catalysts, catalyst supports, adsorbents, ion exchangers or absorbers.

* * * * *